May 22, 1951

E. A. McCLENDON 2,554,414

APPARATUS FOR DETERMINING
A CHEMICALLY REACTIVE GAS

Filed July 12, 1945

INVENTOR
E. A. MC CLENDON
BY Hudson & Young
ATTORNEYS

Patented May 22, 1951

2,554,414

UNITED STATES PATENT OFFICE 2,554,414

APPARATUS FOR DETERMINING A CHEMICALLY REACTIVE GAS

Ernest A. McClendon, Bartlesville, Okla., assignor to Phillips Petroleum Company, a corporation of Delaware Application July 12, 1945, Serial No. 604,607

5 Claims. (Cl. 23—255)

This invention relates to a hydrogen sulfide recording apparatus. In one of its more specific aspects it relates to an automatic mechanism for continuously recording hydrogen sulfide concentrations in gaseous mixtures containing this gas.

Continuously operating devices for recording hydrogen sulfide concentrations in gaseous mixtures have been none too satisfactory. A test method of long standing involves the use of moist lead acetate paper, when if hydrogen sulfide is present, black to grayish lead sulfide will be precipitated on the white paper. This method, while satisfactory in a qualitative way, must be carried out by hand. Rate of blackening of the test paper or the intensity and extent of blackening are considered to indicate degree of concentration. That is, a moist test paper which when exposed to a gas containing hydrogen sulfide is immediately blackened is an indication of a high or relatively high concentration of this gas. Most chemists are familiar with the qualitative use of such test paper.

Commercial or pilot plants operating on a continuous scale may have need for continuous recordings of hydrogen sulfide concentrations at certain process points just like temperature and pressure records are now considered indispensable.

I have devised an apparatus for automatically and continuously making permanent records of hydrogen sulfide concentrations in gases.

One object of my invention, broadly, is to provide such an apparatus.

Another object of my invention is to provide an automatically operating quantitative hydrogen sulfide recorder.

Still another object of my invention is to provide a continuous or substantially continuous recorder for hydrogen sulfide in gases which apparatus does not require the services of an operator.

These as well as additional objects and advantages will be apparent to those skilled in such art by reference to the following detailed description and annexed drawing which respectively describes and illustrates a preferred embodiment of the invention, and wherein Figure 1 represents a diagrammatic elevational view of one form of my apparatus.

Figure 1:
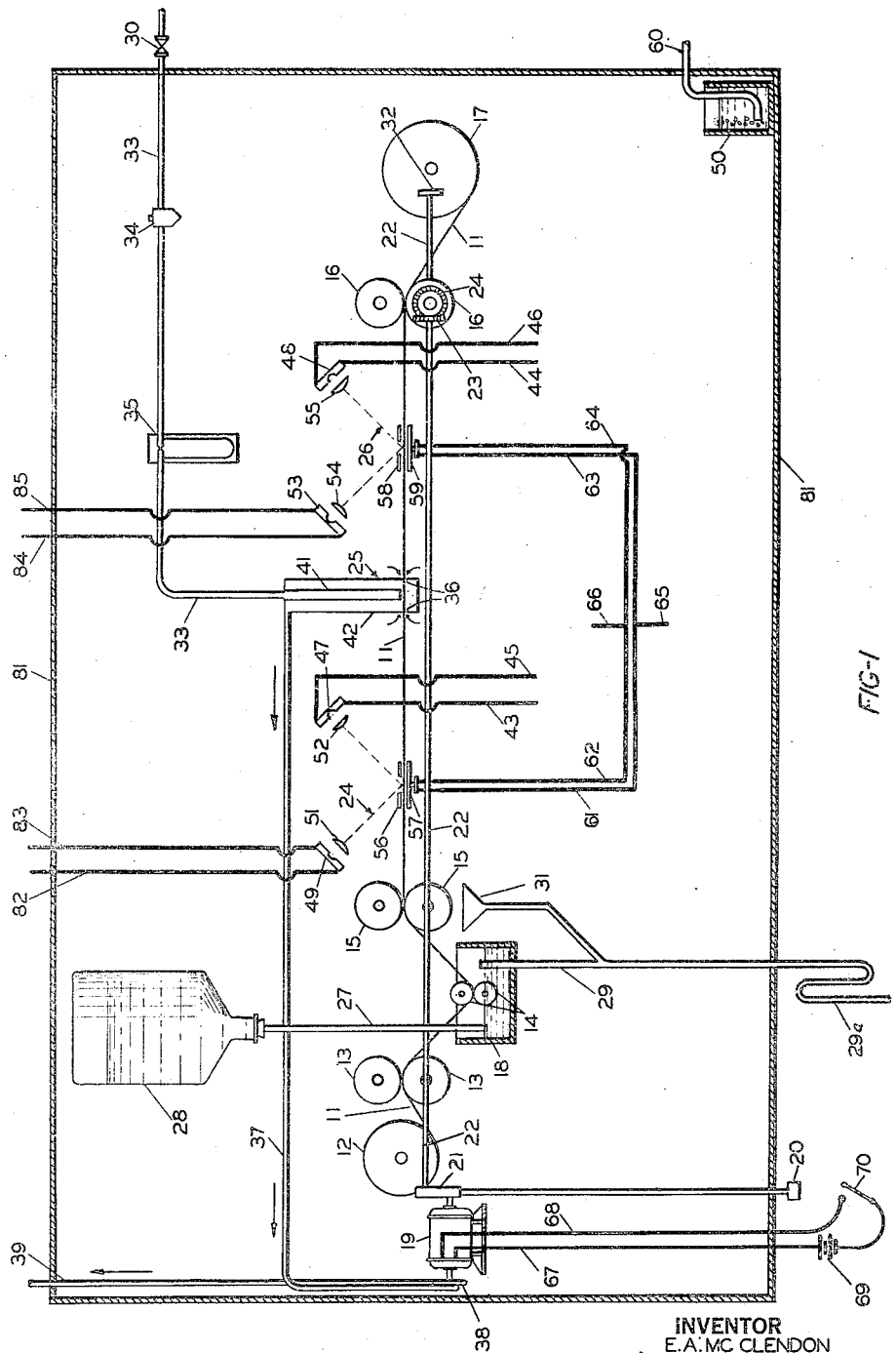

Referring to the drawing and particularly to Figure 1, a strip of porous, unglazed paper 11, about a half-inch in width is threaded from a roll 12 between three sets of rollers 13, 15 and 16. Used paper is wound on a used paper roller 17. Between the two sets of rollers 13 and 15, the paper passes between a set of small rollers 14, one of which is partly immersed in a chemical solution contained in a vessel 18. This roll of paper is ultimately transferred from the original "new" roll 12 to the "used" paper roll 17 during the operation of my apparatus. This entire paper transferring system is powered by a motor 19, through a speed reduction apparatus 21. This speed reducer 21 is in direct connection with a rotatable shaft 22. On the opposite end of this shaft is a friction drive apparatus for rotating the used paper roll 17. Also mounted on this shaft is a bevel gear 23 which meshes with a bevel gear 24 on one of the wheels 16. The positive drive cannot be on wheel 17 since its circumference increases as used paper accumulates thereon. The strip of paper also passes through a photoelectric apparatus 24, a gas exposure cell 25 and a second photoelectric apparatus 26. These mechanisms will be explained later in detail.

The chemical solution mentioned above as contained in vessel 18 is added to this vessel by way of a tube 27 and a source of stock solution contained in a stock vessel 28. An overflow tube 29 is inserted in vessel 18, as shown, in order to maintain a certain liquid level therein. A side arm from this overflow tube carries a funnel 31 to catch drippings from wheels 15 in case excess chemical solution is carried by the paper and removed by the rolls 15. It is obvious, however, that the funnel 31 need not be connected with the overflow tube 29, since a separate tube may be used, the main point being only a disposition of overflow solution from vessel 18 and droppings from wheels 15. I have combined these disposals merely as a matter of simplicity. A trap or siphon 29a seals off outside gases.

Any suitable means may be used for maintaining a substantially constant liquid level in container 18. I have used the particular method illustrated in Figure 1 because of simplicity and ease of construction. As shown, the position of the lower end of the tube 27 determines the liquid level. The lower limit of the level is determined by the point at which air is admitted into the tube thus permitting liquid to flow by gravity from reservoir bottle 28 through the tube 27 into container 18, the amount of liquid so added to container 18 being dependent upon the volume of air admitted. Thus as soon as the level rises sufficiently to cover the open end of tube 27 the flow of liquid is stopped. The tube 29 is merely a safety device to prevent accidental over addition of liquid to the vessel 18, and is simply an overflow tube of appreciable diameter, so large in fact as to be able to carry away liquid as fast as it can run by gravity through tube 27 should the bottle 28 become accidentally broken and destroying the partial vacuum in its uppermost portion. For best protection the bottle 28 should be mounted at one side of vessel 18 and not directly over rollers 14 and the paper strip at this point.

The motive power for driving the rollers 16 is furnished by the drive shaft 22 and motor 19. I have shown rollers 16 as being the "drive" rollers, while friction of rollers 15, 14, 13 and 12 tend to maintain some tension on the strip of paper, especially while passing through apparatus members 24, 25 and 26. In case construction of the apparatus is such that the paper after being moistened with reagent in vessel 18 becomes weakened and subject to breakage between rollers 14 and spool 17, then the rollers 13 and 15 may well be equipped with bevel gear drives similar to that shown in connection with rollers 16. As mentioned hereinabove the used paper roller 17 is turned by a friction drive wheel 32, the friction drive being used since the circumference increases during the use of a roll of test paper.

Hydrocarbon or other gas to be tested for hydrogen sulfide from a source, not shown, by way of a sample line 33, passes through a pressure regulator and filter 34, through a manometer 35 and on into the gas exposure apparatus 25. The sample line 33 carries a hand operated valve 30 located for manual operation. A small gas exhausting pump 38 powered by the motor 19 serves to remove gases from the gas exposure apparatus 25 and such air as enters the exposure apparatus 25 through openings 36, by way of an exhaust pipe 37. From the exhausting pump 38 these gases are expelled from the apparatus through a discharge line 39 for such disposal as desired. The pressure regulator discharges the gas to be tested at a pressure only sufficiently great to cause flow of such an amount as to permit satisfactory operation of the gas exposure member 25.

The gas exposure member 25 is composed of several portions, a gas exposed cell proper 41, a hood member 42 covering the gas exposure cell 41, the hood member containing the slots 36. The lower and open end of the cell 41 terminates at a point just above the strip of paper 11 as the latter is threaded through the slots 36 of the hood member.

Briefly the operation of my apparatus is: the paper strip 11 is wetted with a "doctor" solution (aqueous sodium plumbite) by rolls 14, one of which dips into this solution in vessel 18. The wetted paper strip moves through the gas exposure cell 25. At the lower and open end of the gas exposure tube 41 the gas such as a hydrocarbon gas containing hydrogen sulfide contacts the plumbite moistened paper. At this point, the paper turns dark with the precipitation of lead sulfide. The degree of this darkening or blackening is dependent upon several factors, among others, as concentration of hydrogen sulfide in the gas, length of exposure between the gas and a given section of the moistened paper, and the concentration of lead in the doctor solution.

Thus, upon exposure in gas cell 25 a darkening of the paper occurs. This "exposed" section of paper is then moved to the photoelectric apparatus 26. This latter then operates photoelectrically to measure the intensity of a beam of light reflected by the lead sulfide darkened section of the paper. To offset or counteract adverse influences such as color of paper or color or reflection characteristics of the moistened paper, temperature, etc., a "blank" photoelectric apparatus 24 is used. This apparatus 24 uses a light source of the same intensity as that used in conjunction with apparatus 26. Then by setting up subsequent apparatus, to be fully explained hereinafter, the differential in light reflection, that is, light reflected in apparatus 24 as opposed to that reflected in apparatus 26 is observed and/or recorded by a recording instrument. By previous calibration of the recording instrument in terms of grains of hydrogen sulfide per cubic foot or per cent by volume or by any other units desired, the hydrogen sulfide content of a gas may be observed and recorded as a permanent operating record.

Figure 2:
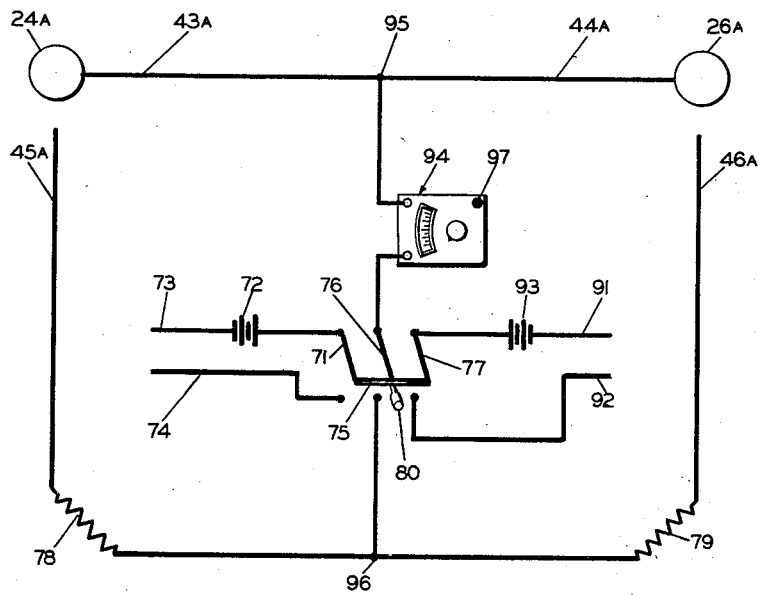
Figure 2 represents a wiring diagram for use with my apparatus when a permanent record is not required.

In case an automatically made permanent record is not desired, the photoelectric assemblies may be of the photovoltaic type. In this type of instrument the exposure of the photocell to light causes an electromotive force to be generated. Figure 2 of the drawing illustrates the electrical principles involved in this embodiment. In this figure, a photovoltaic apparatus 24a corresponds to the photo unit 24 of Figure 1, while a second photovoltaic apparatus 26a corresponds to the photo unit 26 of Figure 1. The two units, 24a and 26a, are connected together so that the electromotive forces generated in each oppose each other. In this manner a "differential" E. M. F. is available for measurement. This two-cell connection is then included in an "electrical bridge" type assembly, with some low resistances 78 and 79. A galvanometer 94 is connected between points 95 and 96 as shown. On account of the very small E. M. F. differential which is generated by the opposed photovoltaic cells 24a and 26a, the galvanometer 94 should be of the "high resistance" type as to permit the flow of substantially no current. In this manner a more accurate voltage observation or in other words a more accurate galvanometer reading may be made. The galvanometer is of course equipped with a push button type switch 97, which may be constructed in the galvanometer, or an ordinary knife switch may be inserted in the circuit, as indicated by reference numeral 76, or both. The galvanometer readings or markings are then calibrated in terms of grains of hydrogen sulfide per cubic foot of gas or in terms of percentage by volume, or in any other terms desired. Then, an observation can be made merely by closing knife switch 76 and button switch 97 and noting the galvanometer reading and upon reference to a calibration chart, the corresponding concentration of hydrogen sulfide is found.

To connect the "electrical bridge" of Figure 2 into the mechanism of Figure 1, it is merely necessary to connect wires 43a and 44a of Figure 2 to wires 43 and 44, respectively, of Figure 1. Then connect wires 45a and 46a of Figure 2 to wires 45 and 46, respectively, of Figure 1. In this embodiment, then, cells 47 and 48 of Figure 1 are the photovoltaic cells, which observe reflected light from the paper tape "before" and "after" exposure to hydrogen sulfide, respectively. For the photovoltaic cell assembly 24 is a source of light 49, a condensing lens 51, a second condensing lens 52 and the actual light sensitive cell 47, for the cell assembly 26 are the corresponding parts, a source of light 53, condensing lenses 54 and 55, and the light sensitive cell 48.

Some auxiliary equipment in connection with the photoelectric apparatus is a framing screen 56 and a lifting table 57 in the unit 24 and a framing screen 58 and a lifting table 59 with unit 26. These framing screens are merely flat black steel screens having a one-half inch square opening. The screens are so installed and arranged that the openings are directly over the paper strip. The steel lifting tables, flat black also, are arranged under the paper tape and directly under the framing screens. The purpose of these lifting tables is to raise the paper strip and hold it rigid against the underside of the framing screen at the time a photoelectric observation is made. The tables may be solenoid operated in a manner suitable for the purpose at hand. In fact from the raised observation position these lifting tables need to drop only such a distance as to permit free movement of the paper strip between the tables and the framing screen. Thus it will be obvious that $\frac{1}{16}$ inch or even less movement will be ample for this purpose. As shown in Figure 1, the electric wires 61 and 62 operate the solenoid of lifting table 57 while wires 63 and 64 lead electrical energy to the solenoid of lifting table 59. These solenoids are wired to operate simultaneously, that is, lead wires 61 and 63 are connected to one wire identified by numeral 65, while leads 62 and 64 are connected to a single wire 66. In this condition, then, when the operator closes a single switch blade identified by numeral 71, then both solenoids operate to raise both lifting tables 57 and 59 simultaneously. A source of E. M. F. 72 is connected in a wire 73 which in turn may be connected directly to wire 66. Another wire 74 from the switch blade 71 connects with wire 65 to complete the solenoid circuits. Switch cross bar 75 is of an insulating material since blade 71, blade 76 and blade 77 close independent and unrelated circuits.

The switch 80 carries a third blade 77 for closing a third electrical circuit. This blade of the switch closes a circuit from a source of current 93 through wires 91 and 92 to wires 82, 83 and 84, 85. These latter wires are connected to wires 91 and 92 in such a manner that closing switch blade 77 illuminates both sources of light 49 and 53 simultaneously.

The electric motor 19 receives energy through lead wires 67 and 68 from a source of electrical energy 69. A switch 70, when closed, permits motor to operate thereby causing paper strip to unroll from roller 12, to pass between rollers 13, 14, 15 and 16 and to accumulate on the used paper roller 17.

This entire apparatus should preferably be enclosed in a case 81 as a means for protection. Gases and vapors in certain areas of petroleum refineries, gasoline plants and many chemical manufacturing plants contain hydrogen sulfide and such gas might have an adverse effect on the operation since lead sulfide darkening could occur on all exposed portions of the paper strip which have been moistened with the treating solution by the rolls 14.

The fan or blower mechanism 38 is attached to the electric motor 19 to exhaust the atmosphere from within the case 81. The gases and air enter the gas cell 25 by way of the slots 36 and pass through tube 37, through the blower and are discharged to the atmosphere through the tube 39. To replace air so removed from within the case 81 an air inlet tube 60 conducts air from outside the case to the bottom of vessel 50 which contains some caustic soda solution or other solution adapted to remove hydrogen sulfide from air bubbling therethrough. In this manner only air free from hydrogen sulfide is permitted to enter the case 81, which is otherwise substantially gas tight.

To prevent possible escape of hydrogen sulfide containing gas through slots 36 in the gas cell 25, it is preferable to close switch 70 and permit the motor 19 to operate the blower 38 continuously and at all times. Under these conditions then the paper tape would be in continuous movement resulting in waste of this strip paper. To prevent undue waste of paper, I have provided a gear disengaging mechanism 20 which operates in such a manner as to permit operation of motor 19 with or without rotation of shaft 22, as desired.

To operate the apparatus for the determination of the hydrogen sulfide content of a hydrocarbon gas, for example, I close switch 70 which starts the exhausting fan 38. I then engage speed reducing gear 21 by operation of mechanism 20 and the paper tape starts to move from roll 12 to roll 17, and enroute becomes moistened with an alkaline plumbite solution by rolls 14, vessel 18 having previously been charged with such a solution. Valve 30 is then opened and gas to be tested flows through sample line 33, pressure regulator 34, manometer 35 into the gas exposure portion 41 of the cell 25. At the open end of tube 41 the gas comes in contact with a freshly moistened section of paper for a predetermined length of time. During this exposure the paper is darkened or blackened in proportion to the hydrogen sulfide content of the gas passing through tube 41. After this exposure the exposed section of paper is moved to a position directly under the opening in the framing screen 58. At this time switch 80 (shown in Figure 2) is closed which turns on sources of light 49 and 53, raises lifting tables 57 and 59 and closes the galvanometer circuit so that the needle of the galvanometer 94 will be deflected in proportion to the difference in intensities of the reflected light beams reaching the photovoltaic cells 47 and 48. If hydrogen sulfide is present in the gas, the reflected light absorbed by cell 48 will be of less intensity than that absorbed by cell 47. With a galvanometer calibration chart having previously been prepared, then by reference to same, the concentration of hydrogen sulfide corresponding to the galvanometer deflection is found.

In the construction of this above explained embodiment of my invention, the photovoltaic cell assembly 26 should be located as closely to the gas cell 25 as mechanically possible. The exact location of the cell assembly 24 is of less consequence, but I prefer, also, to have this cell as close to the gas cell 25 as convenient.

This embodiment of apparatus may be operated in either of two manners, first intermittently, or second continuously. By intermittently, I mean the operation as explained above, that is, make an exposure on the paper tape while the latter is stationary, that is not moving. Then, after exposure for a standard length of time, the gas may be shut off by closing valve 30 and the exposed portion of the paper tape moved to the framing screen 58 by manipulation of the gear disengaging mechanism 20. Then by closing the 3-blade switch 80, the photovoltaic cell circuits are closed, the lifting tables rise and the galvanometer needle moves in proportion to the differential of light intensities reaching cells 47 and 48.

In case another determination or a check determination is desired, this operation may be repeated and as often as desired.

The second or continuous method consists in running the tape from roll 12 to roll 17 at all times, and with gas being tested flowing through the exposure cell at all times. In this case all tape from the exposure cell 25 to the right is colored or darkened according to the $H_2S$ content of the gas being tested. In this case a critical point is to make certain that any given point on the test paper remains under the exposure tube 41 for a standard and predetermined length of time, such a time having been used in the calibration of the mechanism. For example, a half minute exposure time may have been found necessary to produce a proper darkening in intermittent determinations as hereinbefore explained, then if the opening of the gas exposure tube 41 is ½ inch by ¾ inch the length of time required for the paper to travel ¾ inch should be this same ½ minute. Any desired rate of travel of the paper may be accomplished through the gear reduction assembly 21 or by use of a variable speed motor 19.

After sufficient time of operation in this manner, the darkening of the paper is proportional to the $H_2S$ content of the gas being tested. In this case the 3-blade switch 80 may be kept closed at all times so that a "continuous" determination will be made. It is best not to have the galvanometer circuit closed during continuous operation since galvanometers draw current and the flow of current tends to decrease the voltage generated. It is for this reason that a galvanometer push button switch 97 is used. The photocells and all other portions of the apparatus may be operating continuously and when a determination is to be made simply close the galvanometer circuit by push button 97. However, a certain time lag will be unavoidable, and that time lag will be the length of time required for a point on the paper tape to travel from the exposure cell 41 to the framing screen 58. To shorten this time lag is the reason for installing the framing screen 58 at a point as near the gas cell 25 as possible. In actual construction the framing screens are placed very near this gas cell since the plane of light travel from the sources 49 and 53 to the photocells 47 and 48 may be at right angles to the line of travel of the paper tape in place of parallel as shown in Figure 1. It is shown in Figure 1 as being parallel merely to indicate the principle of operation and to illustrate more clearly the general mode of apparatus assembly.

By the use of the galvanometer 94 as explained hereinbefore no permanent record of the intermittent or continuous $H_2S$ determinations is made. In most operations such a permanent record is desirable. If the apparatus as above explained is modified in a certain manner a permanent record can be made by use of a standard type of recorder.

Figure 3:
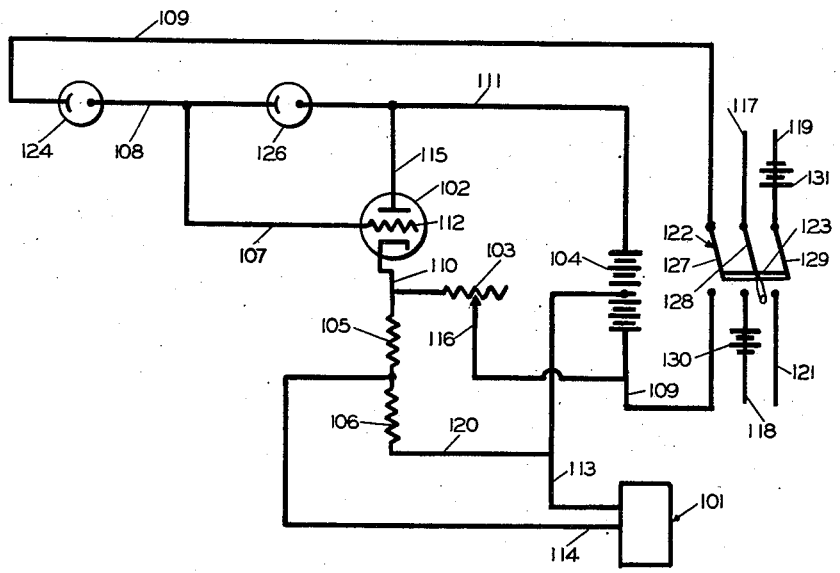
Figure 3 represents a wiring diagram for use with my apparatus when a permanent record is required.

For use of a potentiometer for recording purposes I use a different kind of a photoelectric cell, one known as a photoemissivity cell. This cell is dependent upon a change of electrical current from a battery or other source of constant E. M. F. as occasioned by light of varying intensity. Figure 3 represents the wiring diagram for use with a recording potentiometer instrument and either photoemissivity or photoconductivity cells. Either type of cell can be used with the wiring diagram illustrated in Figure 3. The recorder instrument referred to by reference numeral 101 may be a standard recording potentiometer such as manufactured by a number of instrument makers.

The photoemissivity or photoconductivity cells 124 and 126 may be connected as illustrated in Figure 3 so that the net current flowing from the pair of cells will represent the differential between the light absorbed by cells 124 and 126. This electrical current differential or rather difference in E. M. F. is amplified by an amplifier tube 102 so that a sufficiently high E. M. F. will be available to operate the recording potentiometer 101. To operate with such a differential of E. M. F. I suggest the use of such a wiring hookup as illustrated in Figure 3 which is a modified form of the well known Gilbert circuit, but do not wish to limit my invention in any manner by this suggestion since other electrical hookups as obvious to those skilled in such art may work equally as well. In this diagram reference numeral 104 refers to a battery as a source of constant current while resistances 103, 105 and 106 are inserted in position as shown. Wire 111 connects the positive terminal of the battery 104 to the photocell 126. Wire 115 connects the plate of the amplifier tube 102 with the wire 111. The grid 112 of the amplifier tube is connected by a wire 107 to a wire 108 which in turn connects the two photocells 126 and 124 as shown. The other terminal of photocell 124 is connected by a wire 109 to the other terminal of the battery 104. Wire 113 from the potentiometer goes to a central terminal of the battery 104 while wire 114 connects the potentiometer with a point between resistances 105 and 106. Wire 120 connects wire 113 to resistance 106 which in turn connects to resistance 105 and thence on to the third terminal of the amplifier tube 102 by way of a wire 110. The adjustable resistance 103 with wire 116 forms a zero balance for the potentiometer, the wire 116 connecting wire 109 with the variable resistance 103.

To tie the circuit and photocells of Figure 3 into the apparatus of Figure 1, wires 43 and 45 and photovoltaic cell 47 are removed from Figure 1 and cell 124 of Figure 3 inserted for the cell 47. Wires 108 and 109 of Figure 3 of course remain connected as shown. In a similar manner wires 44 and 46 and photovoltaic cell 48 of Figure 1 are removed and cell 126 inserted in place of the removed cell 48. Wires 108 and 111 remain connected to the cell 126.

A three-blade switch 122 serves to open and close the photocell circuits. Bar 123 is an insulating member to hold rigid the three blades of the switch 122. Blade 127 controls the recording potentiometer circuit as shown, blade 129 controls the "source of light" circuit of Figure 1 since wire 117 of Figure 3 connects with wires 82 and 84 of Figure 1, and wire 118 of Figure 3 connects with wires 83 and 85 of Figure 1, the electrical energy for lighting light sources 49 and 53 coming from a power source 130 of Figure 3. In like manner the switch blade 129 controls the operation of the solenoid lifting tables 57 and 59 since wires 119 and 121 of Figure 3 connect with wires 65 and 66 of Figure 1. A source of electrical energy 131 shown in line 119 of Figure 1 furnishes power for operating the solenoids.

Since this embodiment of Figure 3 is intended to operate continuously, it will be advisable to adjust the solenoid operated lifting tables 57 and 59 so that they will hold the paper tape 11 firmly against the framing screens 56 and 58 but permit proper travel of the tape from the "new" roller 12 to the "used" roller 17. Other means for raising the lifting tables can be used, I merely suggest solenoids since they work well.

When the photocells 124 and 126 and wiring diagram shown in Figure 3 are substituted in the apparatus of Figure 1 as explained above, then a permanent record of the $H_2S$ content of a gas can be made.

To operate this combination I merely open valve 30 (of Figure 1) to permit sample gas to flow through the exposure cell 25, motor 19 operates to permit travel of paper tape through the apparatus as hereinbefore explained. The paper must travel sufficiently slowly to permit a standard time exposure to $H_2S$ carrying gases in the gas cell 25. Of course, blower 38 continuously removes gases from the gas cell 25 and exhausts them through tube 39 as shown. When operating in this manner, a continuous record of $H_2S$ concentrations in a gas can be made and I have found that my apparatus as herein described works very well when testing hydrocarbon and other gases.

As mentioned I do not wish to limit my invention by the particular galvanometer and potentiometer circuits given since they are merely exemplary, since other circuits known to those skilled in such art may work equally as well.

While my invention includes the use of two photovoltaic cells or two photoemissivity cells in their respective embodiments, I do not wish to limit my invention to the use of two cells, that is, one for measuring light reflection before exposure to $H_2S$ and one after. By assuming a definite light reflection from a strip of white paper, I can operate my apparatus with only one photocell, that is, one installed to measure reflection of light from the tape containing the lead sulfide. With a proper calibration of either the galvanometer or the recording potentiometer reasonably accurate and dependable determinations can be made. I have found that for many purposes the accuracy of the one-cell apparatus is sufficient, but when accurate control of processing operations is necessary, the use of the two-cell apparatus is distinctly advantageous. One modification of apparatus which I have not shown on the drawing for reasons of simplicity is the use of a single source of light to furnish the "incident" light, that is, to replace the two light sources 49 and 53 of Figure 1.

Another modification which may be found useful under certain conditions is to measure the light of transmission passing "through" the tape 11 in place of measuring the reflected light as herein disclosed. Such a modification is useful when the sulfide formed is "shiny" and tends to reflect light in place of absorbing light.

I have mentioned above the use of a doctor or sodium plumbite solution for moistening the paper tape. I do not wish to limit my invention to the use of this lead containing solution for determining the $H_2S$ content of hydrocarbon gases since the principle taught herein is of wide application and may be used for the quantitative determination of any compound in a gaseous mixture which compound forms another compound which absorbs light in such a manner that the absorption can be measured by light sensitive photoelectric cells.

For the determination of hydrogen sulfide I have found that a soluble lead salt in an alkaline solution, the regular doctor treating solutions for example, works exceptionally well. It works well when white light is used as the photoelectric light sources since the precipitated lead sulfide is quite black to white light and even very low concentrations of $H_2S$ produce a marked blackish or grayish coloration and these colorations are effective light absorbers. Other metallic salts may be used for impregnating the paper, as for example, cupric compounds, mercuric compounds, nickel, cobalt, bismuth, cuprous and silver compounds which are sufficiently soluble as to form a solution sufficiently concentrated to impregnate the paper tape. The sulfides of these above mentioned metals are for the most part black and obviously are effective for absorbing white light. However, I have found that it is not necessary to use a metal ion which forms a "black" sulfide with $H_2S$ since such ions as arsenic, antimony or others which form colored sulfides may be used, since colored materials absorb light also.

In addition, it is not necessary that the sources of light emit white light since colored lights are also susceptible to absorption. For particular and specific problems one skilled in the art may select a certain colored light which gives an excellent absorption upon reflection by a sulfide of a certain color.

Further applications of my broad principle may be made when it is realized that other gases than hydrocarbons can contain materials other than hydrogen sulfide which give color reactions. For example, volatile acid in flue or other gases can be detected by using a paper tape moistened with an indicator solution which gives a color change with acid. Ammonia in gases can be detected in a similar manner.

The use of the sodium plumbite solution for moistening the paper may take a very black coloration with the hydrogen sulfide. A lead acetate solution or other soluble lead salts gives a black coloration, but none gave as black a color with a given concentration of hydrogen sulfide as does the alkaline sodium plumbite. This latter solution is inexpensive, works well, and is, in general, quite satisfactory.

Materials of construction of portions of my apparatus might well warrant a word of explanation. Most of the apparatus, however, may be constructed or assembled from standard equipment available on the market. Any parts coming in contact with the hydrogen sulfide containing gas or with the sodium plumbite solution should be resistant to corrosive action from these materials. The rollers 14 should be constructed of materials which is resistant to corrosive action of the tape moistening solution, which in the preferred embodiment described herein is an alkaline sodium plumbite solution. I have found that sponge rubber rollers or rollers surfaced with sponge rubber serves well for wetting or moistening the paper tape. The rollers' surfaces should be such as to moisten the paper uniformly so that black lead sulfide precipitate formed in the gas exposure cell may be uniform over the area exposed to reflection by the framing screen 58. If uniform darkening of the paper is not accomplished then results as measured by the photo cells cannot be considered dependable. The sponge rubber rolls and surfaces which I have used gave uniform impregnation of the paper tape.

Likewise rolls 15 should be resistant to doctor solution corrosion since they assist in removing excess solution carried by the paper. Rolls 16 may be somewhat less subject to corrosion than rolls 15 since by the time moistened paper reaches these rolls some drying may have occurred. In any event it is well to see that these rolls also are resistant to possible corrosive action from the moistened paper.

When either embodiment of my invention is used, that is, the galvanometer or the recording potentiometer instruments, caution should be exercised to make certain that neither of these instruments is exposed to corrosive gaseous atmospheres. For this reason it might be well to mount them in a separate case.

The main housing case 81 should have a glass observation window and, preferably, the entire front wall might well be of glass for observation purposes. Since the entire assembly is not large, I have found that an all glass case held together by angle iron joints serves well for the purpose. The lid for the case should be removable, or preferably the front observation glass side might be hinged for easy access. In any event, when closed for operation, the case should be reasonably gas tight since hydrogen sulfide from an extraneous source might prematurely blacken the moistened tape as well as form a black precipitate in the doctor solution vessel 18.

I have shown bottle 28 for containing stock doctor solution as mounted within the case 81; the apparatus may be constructed in this manner or the stock solution bottle may be set outside the case, as desired.

The electric motor 19 may be of any standard type or speed desired, providing suitable gear reduction apparatus 21 be provided.

The paper stock used with my test apparatus must be such as to retain a certain strength when wetted with the alkaline plumbite solution.

Having described my invention, I claim:

1. An apparatus for measuring the content of a chemically reactive gas comprising, in combination, a first roller, a second roller, driving means connected to said second roller, said second roller being constructed so as to unwind a paper tape from said first roller to said second roller when actuated by said driving means and pass said paper tape through means mounted intermediate said first and second roller consisting of, in order, an impregnating vessel, a first photoelectric cell assembly, a gas exposure cell, and a second photoelectric cell assembly, said gas exposure cell being further characterized in that it comprises a closed vertical slotted hood member, a first conduit extending through a wall of said hood member and centrally disposed therein with its inner end open and positioned adjacent to the bottom portion of said hood member and positioned above and between a pair of slots located in bottom portions of opposite walls of said hood member, said slots being arranged so as to pass said paper tape horizontally therethrough, said first conduit being adapted to conduct a gaseous mixture into said gas cell, a second conduit attached to said hood member adapted to exhaust gases from within said cell to the atmosphere and a recording potentiometer connected to said first and second photoelectric cell assemblies.

2. The apparatus of claim 1 wherein the photoelectric cell assemblies are photoemissivity cell assemblies.

3. The apparatus of claim 1 wherein the photoelectric cell assemblies are photoconductivity cell assemblies.

4. The apparatus of claim 1 wherein the photoelectric cell assemblies are photovoltaic cell assemblies.

5. An apparatus for measuring the content of a chemically reactive gas comprising, in combination, a gas-tight vessel including, a first roller, a second roller, a motor connected to said second roller, said second roller being constructed so as to unwind a paper tape from said first roller to said second roller when actuated by said motor and pass said paper tape through means mounted intermediate said first and second roller consisting of, in order, an impregnating vessel, a first photoelectric cell assembly, a gas exposure cell, and a second photoelectric cell assembly, said gas exposure cell being further characterized in that it comprises a closed vertical slotted hood member, a first conduit extending through a wall of said hood member and centrally disposed therein with its inner end open and positioned adjacent to the bottom portion of said hood member and positioned above and between a pair of slots located in bottom portions of opposite walls of said hood member, said slots being arranged so as to pass said paper tape horizontally therethrough, said first conduit being adapted to conduct a gaseous mixture into said gas cell, a second conduit attached to said hood member and extending outside said gas-tight vessel, a pump in said second conduit, a driving connection between said pump and said motor, whereby said pump and said conduit function to exhaust gases from within said cell to the atmosphere, a vessel adapted to contain a liquid for absorbing said reactive gas, a tube immersed in said liquid and extending outside said gas-tight vessel to replace air withdrawn through said slots and said second conduit, the air thus replaced being freed from reactive gas by bubbling through said liquid, and a recording potentiometer connected to said first and second photoelectric cell assemblies.

ERNEST A. McCLENDON.

REFERENCES CITED

The following references are of record in the file of this patent:

UNITED STATES PATENTS

| Number | Name | Date |
| --- | --- | --- |
| 1,711,742 | Nordlander | May 7, 1929 |
| 2,113,063 | Stryker et al. | Apr. 5, 1938 |
| 2,153,568 | Johnson | Apr. 11, 1939 |
| 2,232,622 | Moses et al. | Feb. 18, 1941 |
| 2,345,090 | Brace | Mar. 28, 1944 |
| 2,382,381 | Calvert et al. | Aug. 14, 1945 |

FOREIGN PATENTS

| Number | Country | Date |
| --- | --- | --- |
| 379 | Great Britain | Dec. 6, 1915 |
| 25,958 | Great Britain | of 1902 |
| 565,192 | Germany | Nov. 26, 1932 |
| 639,177 | Germany | Nov. 30, 1936 |

OTHER REFERENCES

Altieri: "Gas Analysis and Testing of Gaseous Materials" (1945), pages 358 and 359, quoting Federal Specification of an earlier date.